(12) United States Patent
Lyons

(10) Patent No.: US 8,267,204 B2
(45) Date of Patent: Sep. 18, 2012

(54) METHODS OF FORMING POLYCRYSTALLINE DIAMOND CUTTING ELEMENTS, CUTTING ELEMENTS, AND EARTH-BORING TOOLS CARRYING CUTTING ELEMENTS

(75) Inventor: Nicholas J. Lyons, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 455 days.

(21) Appl. No.: 12/539,349

(22) Filed: Aug. 11, 2009

(65) Prior Publication Data
US 2011/0036641 A1 Feb. 17, 2011

(51) Int. Cl.
*E21B 10/46* (2006.01)
*E21B 10/573* (2006.01)
(52) U.S. Cl. .................................. 175/432; 175/434
(58) Field of Classification Search ............... 175/426, 175/425, 433, 434, 430, 420.02, 432
See application file for complete search history.

(56) References Cited

U.S. PATENT DOCUMENTS

| | | | |
|---|---|---|---|
| 3,745,623 A | 7/1973 | Wentorf, Jr. et al. | |
| 4,151,686 A | 5/1979 | Lee et al. | |
| 4,224,380 A | 9/1980 | Bovenkerk et al. | |
| RE32,380 E | 3/1987 | Wentorf, Jr. et al. | |
| 4,766,040 A | 8/1988 | Hillert et al. | |
| 4,793,828 A | 12/1988 | Burnand | |
| 5,127,923 A | 7/1992 | Bunting et al. | |
| 6,189,634 B1 | 2/2001 | Bertagnolli et al. | |
| 6,258,139 B1 * | 7/2001 | Jensen | 51/307 |
| 6,544,308 B2 | 4/2003 | Griffin et al. | |
| 6,601,662 B2 | 8/2003 | Matthias et al. | |
| 7,377,341 B2 | 5/2008 | Middlemiss et al. | |
| 7,506,698 B2 * | 3/2009 | Eyre et al. | 175/57 |
| 7,517,589 B2 | 4/2009 | Eyre | |
| 7,533,740 B2 * | 5/2009 | Zhang et al. | 175/432 |
| 7,681,669 B2 * | 3/2010 | Cannon et al. | 175/374 |
| 7,942,219 B2 * | 5/2011 | Keshavan et al. | 175/434 |
| 7,998,573 B2 * | 8/2011 | Qian et al. | 428/325 |
| 2003/0129780 A1 * | 7/2003 | Auberton-Herve | 438/46 |
| 2006/0060390 A1 | 3/2006 | Eyre | |
| 2006/0060391 A1 | 3/2006 | Eyre et al. | |
| 2006/0086540 A1 | 4/2006 | Griffin et al. | |

(Continued)

FOREIGN PATENT DOCUMENTS

JP 59219500 A 12/1984

(Continued)

OTHER PUBLICATIONS

International Search Report for International Application No. PCT/US2010/044863 mailed Mar. 30, 2011, 3 pages.
International Written Opinion for International Application No. PCT/US2010/044863 mailed Mar. 30, 2011, 4 pages.
International Preliminary Report on Patentability for International Application No. PCT/US2010/044863 dated Feb. 14, 2012, 6 pages.

*Primary Examiner* — Kenneth L Thompson
(74) *Attorney, Agent, or Firm* — TraskBritt

(57) ABSTRACT

Methods of forming polycrystalline diamond elements include forming a polycrystalline diamond compact comprising a cavity in a surface thereof. A catalyst is at least substantially removed from the polycrystalline diamond compact, and the polycrystalline diamond compact is secured to a supporting substrate. Cutting elements include a diamond table formed with a cavity in a back side surface thereof and a supporting substrate secured to the back side surface of the diamond table. Earth-boring tools comprise a bit body carrying one or more cutting elements including a diamond table, a supporting substrate and an adhesion layer comprising a superhard material between and bonding the cutting table and the supporting substrate.

41 Claims, 5 Drawing Sheets

U.S. PATENT DOCUMENTS

| | | | |
|---|---|---|---|
| 2007/0181348 A1 | 8/2007 | Lancaster et al. | |
| 2008/0206576 A1 | 8/2008 | Qian et al. | |
| 2009/0313908 A1* | 12/2009 | Zhang et al. | 51/309 |
| 2010/0012389 A1* | 1/2010 | Zhang et al. | 175/432 |
| 2011/0042147 A1* | 2/2011 | Fang et al. | 175/426 |

FOREIGN PATENT DOCUMENTS

| | | |
|---|---|---|
| WO | 2004106003 A1 | 12/2004 |
| WO | 2004106004 A1 | 12/2004 |
| WO | 2005110648 A2 | 11/2005 |

* cited by examiner

METHODS OF FORMING POLYCRYSTALLINE DIAMOND CUTTING ELEMENTS, CUTTING ELEMENTS, AND EARTH-BORING TOOLS CARRYING CUTTING ELEMENTS

TECHNICAL FIELD

Embodiments of the invention relate to methods of forming polycrystalline diamond cutting elements having at least a portion of a diamond table substantially free of catalytic material, to cutting elements so formed, and earth-boring tools employing such cutting elements.

BACKGROUND

Superabrasive cutting elements in the form of Polycrystalline Diamond Compact (PDC) structures have been commercially available for almost four decades, and PDC cutting elements having a polycrystalline diamond table formed on the end of a supporting substrate for a period in excess of twenty years. The latter type of PDC cutting elements commonly comprises a thin, substantially circular disc (although other configurations are available), commonly termed a "table," including a layer of superabrasive material formed of diamond crystals mutually bonded under ultrahigh temperatures and pressures and defining a substantially planar front cutting face, a rear face and a peripheral or circumferential edge, at least a portion of which is employed as a cutting edge to cut the subterranean formation being drilled by a drill bit on which the PDC cutting element is mounted.

PDC cutting elements are generally bonded over their rear face during formation of the superabrasive table to a backing layer or substrate formed of cemented tungsten carbide, although self-supporting PDC cutting elements are also known, particularly those stable at higher temperatures, which are known as Thermally Stable Polycrystalline Diamond, or "TSPs." Such cutting elements are widely used on rotary fixed cutter, or "drag," bits, as well as on other bits and tools used to drill and ream subterranean formations, such other bits and tools including without limitation core bits, bi-center bits, eccentric bits, hybrid (e.g., rolling components in combination with fixed cutting elements), roller cone bits, reamer wings, expandable reamers, and casing milling tools. As used herein, the term "drill bit" encompasses all of the foregoing, and equivalent structures.

In the formation of either type of cutting element, a catalyst is usually employed to stimulate diamond-to-diamond bonding of the diamond crystals. Unfortunately, the presence of a catalyst in the diamond table may lead to thermal degradation commencing at about 400° C. due to differences in the coefficients of thermal expansion (CTEs) of the diamond and the catalyst, and commencing around 700-750° C. due to stimulation of back-graphitization of the diamond to carbon by the catalyst. Such temperatures may be reached by the cutting edge of a PDC cutting element during drilling of a formation, despite the use of drilling fluid as a cooling agent and despite relatively rapid heat transfer into the diamond table, the substrate and the body of the drill bit on which the cutting element is mounted.

It has been recognized in the art that removal of the catalyst from the cutting surface of the diamond table, particularly at the cutting edge thereof and along the side of the diamond table proximate the cutting edge and extending toward the substrate, reduces the tendency of those portions of the diamond table to degrade due to thermal effects. Consequently, provided the depth of removal of the catalyst is sufficient, the life of the diamond table is extended. The recognition of the aforementioned thermal degradation effects and how and from what portion of the diamond table the catalyst may be beneficially removed is disclosed in, among many other documents, Japanese Patent No. JP59-219500, as well as in U.S. Pat. Nos. 4,224,380, 5,127,923, 6,544,308 and 6,601,662, U.S. Patent Publications Nos. 2006/0060390, 2006/0060391, 2006/0060392, 2006/0086540, and PCT International Publication Nos. WO 2004/106003, WO 2004/106004 and WO 2005/110648. The disclosure of each of the foregoing documents is hereby incorporated herein in its entirety by this reference.

BRIEF SUMMARY

Embodiments of the present invention relate to methods of forming polycrystalline diamond elements, such as cutting elements suitable for subterranean drilling, exhibiting enhanced thermal stability, resulting cutting elements, and earth-boring tools employing such cutting elements.

Various embodiments of the present disclosure comprise methods of forming a polycrystalline diamond element. According to one or more embodiments of such methods, a polycrystalline diamond compact comprising a cavity in a surface thereof is formed. A catalyst is at least substantially removed from the polycrystalline diamond compact, and the polycrystalline diamond compact is secured to a supporting substrate with the cavity facing the supporting substrate.

Other embodiments comprise PDC cutting elements. At least some embodiments of such PDC cutting elements may comprise a diamond table formed with a cavity in a back side surface thereof. A supporting substrate is secured to the back side surface of the diamond table. An adhesion layer is disposed between the diamond table and the supporting substrate. The adhesion layer comprises a superhard or hard material bonding the diamond table and the supporting substrate together.

In additional embodiments of a polycrystalline diamond element, a polycrystalline diamond table formed with a cavity in a back side surface thereof is secured to a supporting substrate. The supporting substrate is secured to the back side surface of the polycrystalline diamond table and a portion of the supporting substrate extends into, and at least partially fills at least a portion of the cavity.

Further embodiments comprise cutting elements for use with an earth-boring tool. At least some embodiments of such cutting elements include a diamond table comprising at least a face portion that is substantially free of a catalyst. A supporting substrate is coupled to the diamond table, and an adhesion layer is disposed between the diamond table and the supporting substrate and at least partially within at least a portion of a cavity in a back side surface of the diamond table. The adhesion layer bonds the diamond table and the supporting substrate together.

Still other embodiments of the present disclosure comprise earth-boring tools including a body. At least one cutting element is carried by the body and comprises a diamond table comprising at least a face portion that is substantially free of a catalyst. The diamond table includes a cavity in a surface opposing the face portion. A supporting substrate is coupled to the diamond table, and an adhesion layer is disposed between the diamond table and the supporting substrate with the cavity facing the supporting substrate. The adhesion layer bonds the diamond table and the supporting substrate together.

DETAILED DESCRIPTION

The illustrations presented herein are, in some instances, not actual views of any particular cutting element or drill bit, but are merely idealized representations employed to describe the present disclosure. Additionally, elements common between figures may retain the same numerical designation.

Figure 1:
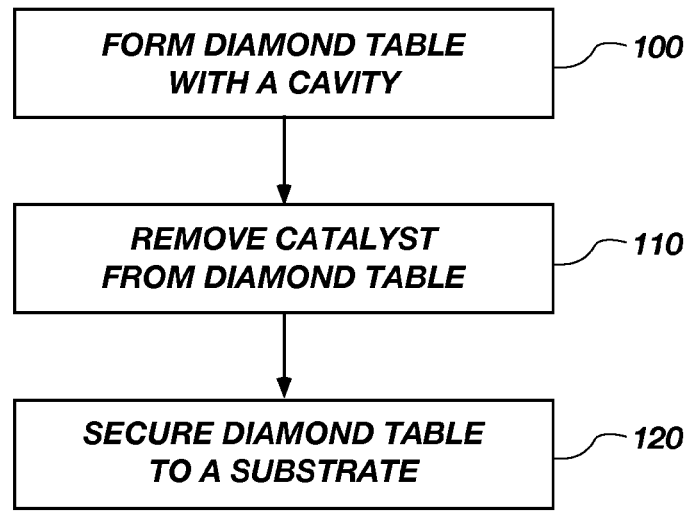
FIG. 1 is a flow chart of a process to form a polycrystalline diamond compact cutting element according to at least one embodiment of the present disclosure.

Various embodiments of the present disclosure comprise methods of forming polycrystalline diamond elements, such as cutting elements suitable for subterranean drilling, exhibiting enhanced thermal stability and resulting cutting elements. Process flow of an embodiment of a method of the present invention is illustrated in FIG. 1, and the associated structures formed during the process are illustrated in FIGS. 2A-2D. Referring to the foregoing drawing figures, in act 100 (FIG. 1), a polycrystalline diamond compact 200 (FIG. 2A) in the form of a diamond table 210 is formed from a mass of diamond particles (e.g., grit) in the presence of a catalyst 220 in a high pressure, high temperature process.

The diamond table 210 is formed with a cavity 230 therein, such that the diamond table 210 comprises a thickness T in the area of the cavity 230. The depth and width of the cavity 230 in the diamond table 210 may be determined by an overall height H of the diamond table 210 and the desired thickness T of the diamond table 210. The thickness T of the diamond table 210 is selected to facilitate substantial removal of the catalyst 220 from the diamond table 210 in a relatively short time. By way of example and not limitation, the diamond table 210 may comprise a thickness T selected from a range of thicknesses from about 1 mm or less to about 2.5 mm. The overall height H of the diamond table 210 may be between about 1 mm and 4 mm. As will be apparent from the present disclosure, the cavity 230 allows for a substantially large diamond table in terms the overall height H, while providing a substantially small thickness T for removing the catalyst 220 from the diamond table 210. For example, a conventional diamond table that has no cavity 230 and that is about 2.5 mm thick may require from about 3 weeks up to about 2 months to substantially remove a catalyst therefrom, depending on the process employed. A diamond table of the present disclosure having a height H of about 2.5 mm and a thickness T of about 1 mm may require only about 1 week to 2 weeks to substantially remove a catalyst therefrom.

The diamond table 210 may be formed on a supporting substrate 240 (as shown) of cemented tungsten carbide or other suitable material as known in the art in a conventional process of the type described, by way of non-limiting example, in U.S. Pat. No. 3,745,623 or may be formed as a freestanding polycrystalline diamond compact (e.g., without supporting substrate) in a similar conventional process as described, by way of non-limiting example, in U.S. Pat. No. 5,127,923. The diamond grit may comprise natural diamond, synthetic diamond, or a mixture, and may comprise diamond grit of different sizes (sometimes termed a "multi-modal" grit mixture), all as known to those of ordinary skill in the art. The catalyst 220 may be supplied in a supporting substrate 240, if employed, or may be admixed with the diamond grit.

The supporting substrate 240, if employed, may be configured to form the cavity 230 and may define the shape and size of the cavity 230. The supporting substrate 240, which is to be removed as described below, may be thin, on the order of a few millimeters, to permit simultaneous fabrication of relatively more diamond tables 210 in a given diamond press cell volume. The cavity may be formed with a nonuniform surface topography, as is known to those of ordinary skill in the art, to minimize detrimental stress concentrations and maximize beneficial stress concentrations when subsequently attached to another supporting substrate as described hereinbelow.

In act 110 (FIG. 1), the catalyst 220 is removed from the diamond table 210 by, for example, leaching the catalyst from the diamond table 210. If present, the supporting substrate 240 is simultaneously removed from diamond table 210 by leaching the material of the supporting substrate 240 from the diamond table 210 while substantially removing the catalyst 220 from the diamond table 210. A variety of materials may be employed for the leaching process. Specifically, as known in the art and described more fully in the aforementioned U.S. Pat. No. 5,127,923 and in U.S. Pat. No. 4,224,380, aqua regia (a mixture of concentrated nitric acid ($HNO_3$) and concentrated hydrochloric acid (HCl)) may be used to dissolve the supporting substrate (if present) and to substantially remove the catalyst 220 from interstitial voids between the diamond crystals of the diamond table and from the crystal surfaces. It is also known to use boiling hydrochloric acid (HCl) and boiling hydrofluoric acid (HF), as well as mixtures of HF and $HNO_3$ in various ratios.

The resulting structure (FIG. 2B) is diamond table 210' that is at least substantially free of the catalyst 220 and includes the cavity 230 formed therein. In act 120 (FIG. 1), another supporting substrate 250 (FIG. 2C) is placed adjacent the diamond table 210' and secured thereto by any conventional process for attaching a diamond table to a supporting substrate as are known to those of ordinary skill in the art. By way of example and not limitation, the supporting substrate 250 may be secured to the diamond table 210' in another conventional high temperature, high pressure (HTHP) process.

Figure 2A:
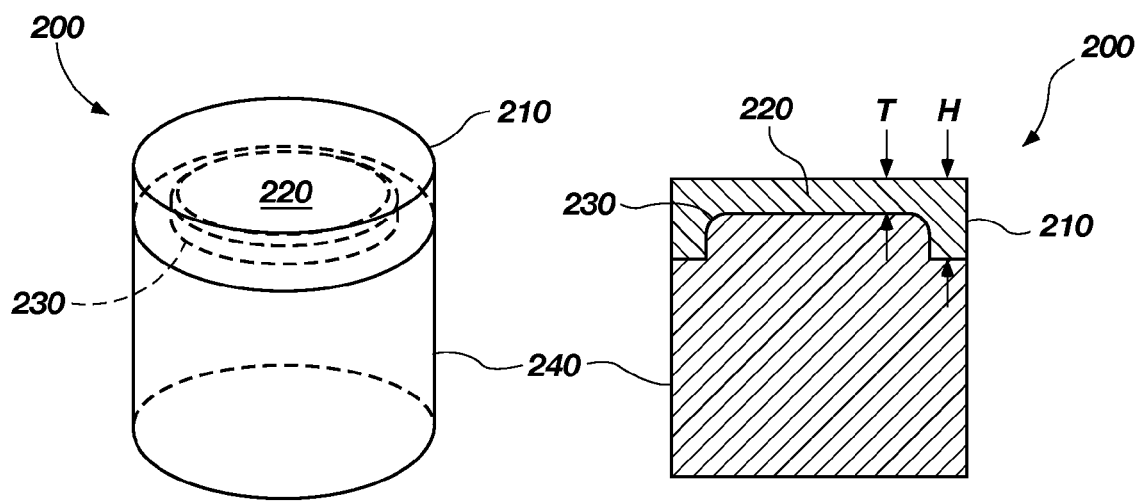
FIGS. 2A-2D depict the formation of a polycrystalline diamond compact cutting element according to at least one embodiment corresponding to the process flow of FIG. 1.
Figure 2B:
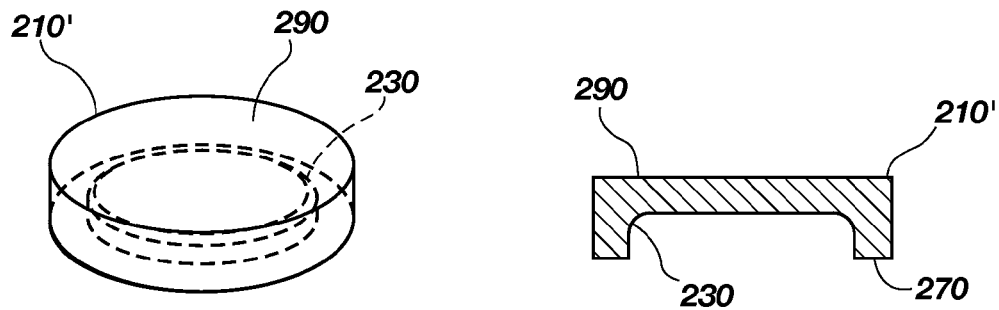
Figure 2C:
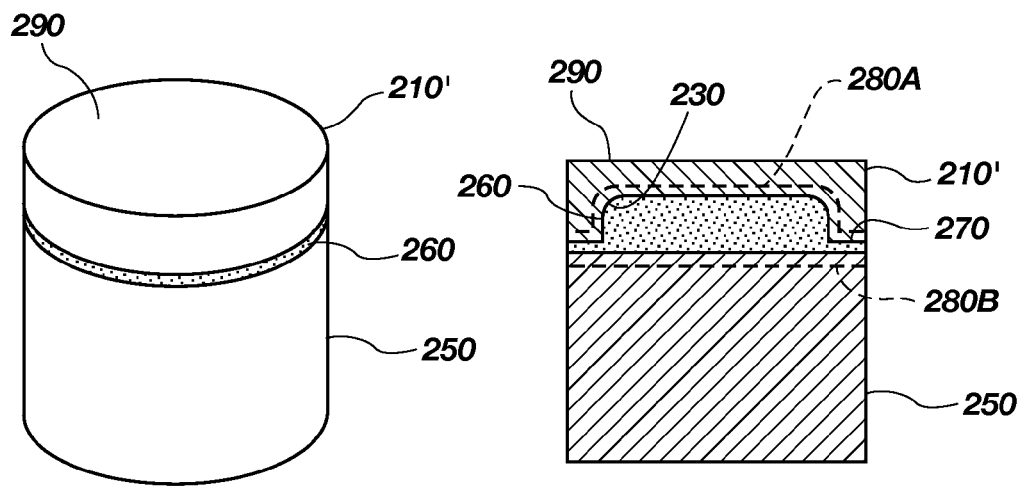
Figure 2D:
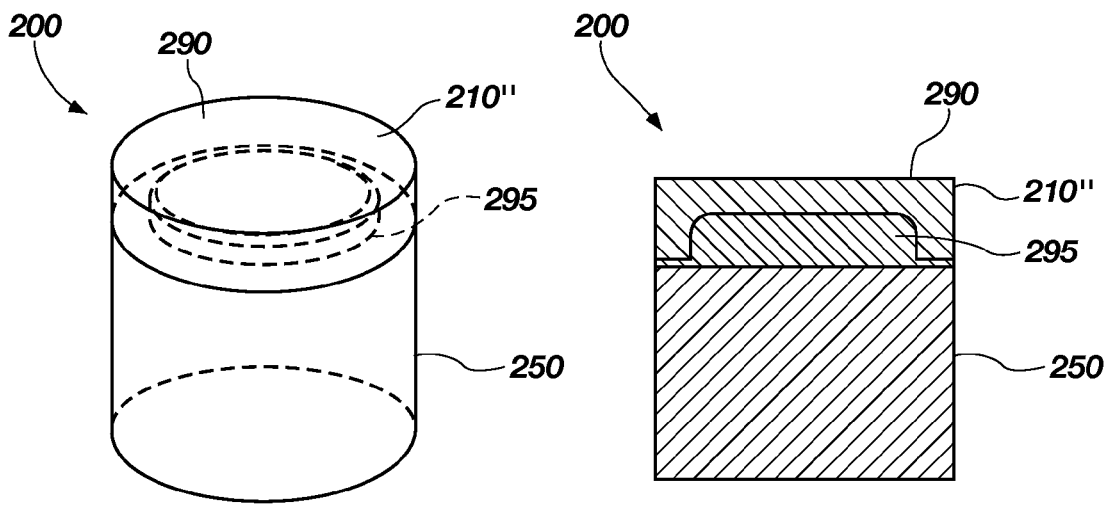

With reference to FIG. 2C, a grit material 260 may be disposed in at least a portion of the cavity 230, as well as between at least a portion of the supporting substrate 250 and the diamond table 210' according to one or more embodiments. The grit material 260 may help to prevent the diamond table 210' from fracturing due to the presence of cavity 230 as well as to aid in adhering the supporting substrate 250 to the diamond table 210'. By way of example and not limitation, the grit material 260 may comprise a superhard or hard material such as diamond grit material, cubic boron nitride grit, silicon carbide, tungsten carbide or other similar superhard or hard materials, which are known to those of ordinary skill in the art, as well as combinations thereof. In at least one embodiment, the grit material 260 may comprise diamond grit material comprising natural diamond, synthetic diamond, or a mixture, and may comprise diamond grit of different grain sizes. For example, the grit material mixture may comprise an average grain size between about 1 to 40 microns, although other grain size mixtures may be employed, depending on the mixtures and the pressing characteristics.

Referring still to FIG. 2C, the cavity 230 in the diamond table 210' may be substantially filled with the grit material 260 in some embodiments. The grit material 260 may be disposed in the cavity 230 substantially equal to, or slightly extending beyond a back side 270 of the diamond table 210', the diamond table 210'. In some embodiments, the grit material 260 may also be disposed to at least partially cover the back side 270 of the diamond table 210'. By way of example and not limitation, the grit material 260 may be disposed to fill the cavity 230 and cover the back side 270 of the diamond table 210' to a thickness ranging between about 20 microns and about 100 microns beyond the back side 270. In some embodiments, the grit material 260 may be disposed to a thickness between about 40 microns to 50 microns beyond the back side 270. Those of ordinary skill in the art will recognize that various ranges of thicknesses may be employed depending on the particular embodiment.

In some embodiments, the grit material 260 may be supplied with substantially no catalyst. In other embodiments, the grit material 260 may be supplied with sufficient catalyst from the supporting substrate 250, a catalyst may be mixed with the diamond grit, the grit particles may be coated or encapsulated by a catalyst, or any combination thereof, as are generally known to those of ordinary skill in the art. The catalyst may be the same or similar to the catalyst 220 employed in forming the diamond table 210 (FIG. 2A) or the catalyst may be different from the catalyst 220.

In some embodiments, the grit material 260 may comprise or may be coated or encapsulated with a hard material such as tungsten. In such embodiments, the hard material may provide for improved mixture compression and may also serve as a barrier to migration of a catalyst from, for example, the supporting substrate 250 into the diamond table 210'.

At the conclusion of act 120 (FIG. 1), a polycrystalline diamond compact (PDC) cutting element 200 (FIG. 2D) includes a diamond table 210", an adhesion layer 295 and the supporting substrate 250. The adhesion layer 295 secures the diamond table 210" to the supporting substrate 250. The adhesion layer 295 comprises a compact of the superhard or hard material comprising the grit material 260, formed when the grit material 260 is subjected to the HTHP process in act 120, bonded to both the diamond table 210" and the supporting substrate 250. According to various embodiments, the adhesion between the diamond table 210" and the adhesion layer 295 may be a result of intergrowth of the diamond table 210' and the grit material 260, or a result of infiltration of a retaining agent from the adhesion layer 295, such as Cobalt (Co) or another flowing material. The adhesion layer 295 may be positioned at least partially within at least a portion of the cavity 230.

When a catalyst is present with the grit material 260, the supporting substrate 250, or both, the diamond table 210" may include some catalyst in a portion thereof. In such a case, the diamond table 210" may be subjected to another process to substantially and selectively remove the catalyst therefrom while precluding contact with the supporting substrate 250 and, by way of a non-limiting example, a portion of a side surface of the diamond table 210". For example, a leaching agent such as any of the abovementioned leaching agents may be employed. One particularly suitable leaching agent is hydrochloric acid (HCl) at a temperature of above 110° C. for a period of about 3 to about 60 hours, depending upon the depth of desired removal of the catalyst from a surface of diamond table 210" exposed to the leaching agent. Contact with the leaching agent may be precluded, as known in the art, by encasing the supporting substrate 250 and a portion of the diamond table 210" in a plastic resin, by coating the supporting substrate 250 and a portion of the diamond table 210" with a masking material, or by the use of an "O" ring seal resistant to the leaching agent, compressed against the side surface of the diamond table 210" using a plastic fixture. The resulting PDC cutting element 200 offers enhanced thermal stability and, consequently wear resistance, during use due to the removal of catalyst from one or more regions of the diamond table 210". The presence of the catalyst material in another region or regions of the diamond table 210" may enhance durability and impact strength thereof.

Figure 3A:
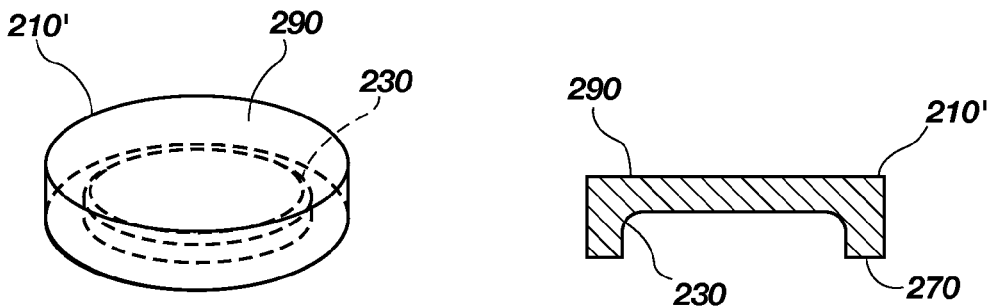
FIGS. 3A-3C depict the formation of a polycrystalline diamond compact cutting element according to another embodiment corresponding to the process flow of FIG. 1.
Figure 3B:
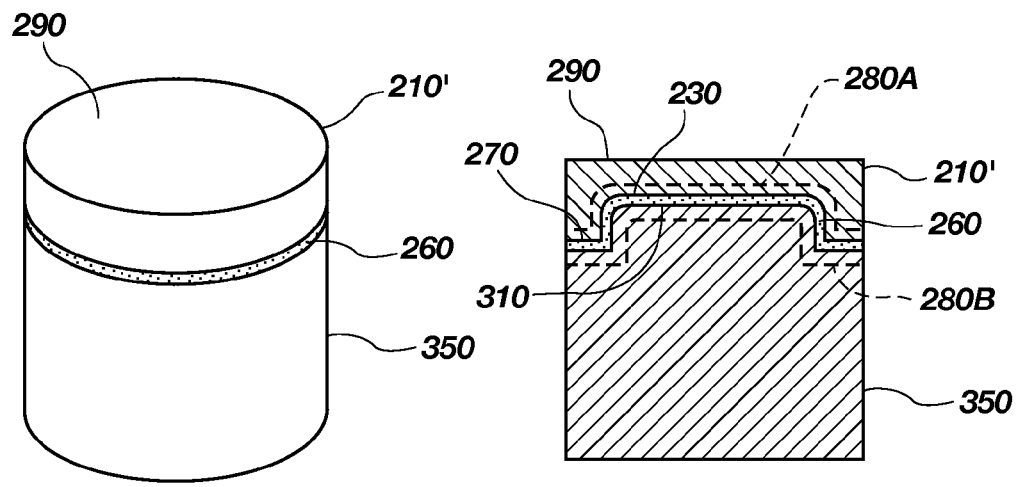
Figure 3C:
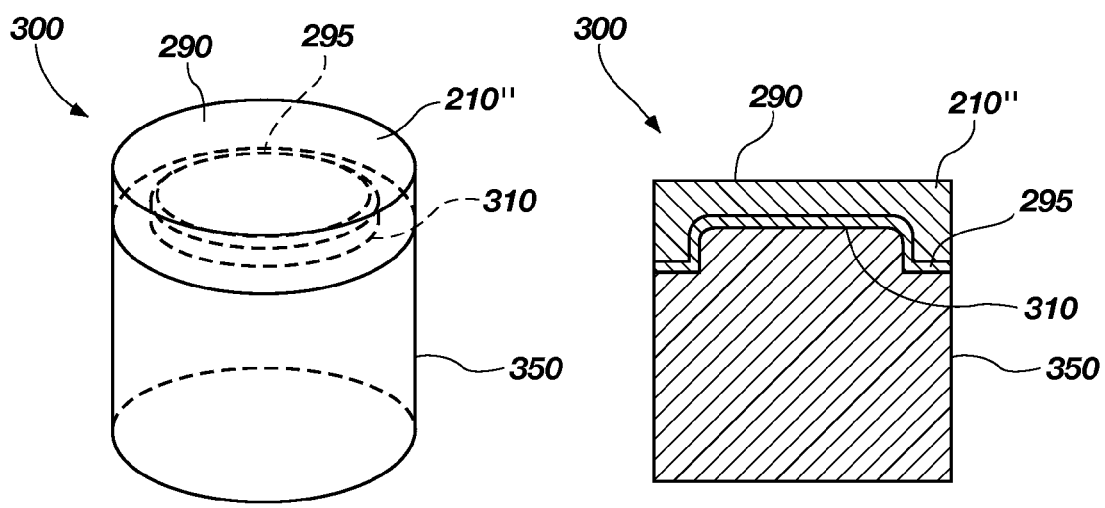

Turning to FIGS. 3A-3C, structures formed during the process illustrated in FIG. 1 according to another embodiment are illustrated. Referring to FIG. 3A, a diamond table 210' like the diamond table 210' of FIG. 2B is formed. As discussed above, the diamond table 210' is formed from a diamond table 210 (FIG. 2A) formed in act 100 (FIG. 1). The diamond table 210 is formed comprising a mass of diamond particles (e.g., grit) in the presence of a catalyst 220 in a high pressure, high temperature process. The diamond table 210 is formed with a cavity 230 therein to comprise a thickness T in the area of cavity 230, and an overall height H. As also discussed above, the diamond table 210 may be formed on a supporting substrate 240 or may be formed as a freestanding polycrystalline diamond compact without the supporting substrate 240. In act 110 (FIG. 1), the catalyst 220 is removed from the diamond table 210, and a supporting substrate 240 (if present) is removed from the diamond table 210. The resulting structure is diamond table 210' shown in FIG. 3A that is at least substantially free of the catalyst 220 and includes the cavity 230 formed therein.

In act 120 (FIG. 1), another supporting substrate 350 (FIG. 3B) is placed adjacent the diamond table 210' and secured thereto by any conventional process for attaching a diamond table to a supporting substrate as are known to those of ordinary skill in the art. By way of example and not limitation, the supporting substrate 350 may be secured to the diamond table 210' in another conventional high temperature, high pressure (HTHP) process.

With continued reference to FIG. 3B, the supporting substrate 350 may extend into and at least partially fill the cavity 230 of the diamond table 210'. For example, the supporting substrate 350 may comprise a protrusion 310 configured to at least partially fit into, and at least partially fill the cavity 230. In some embodiments, the cavity 230 may be formed and configured, in correlation with the supporting substrate 350 and the protrusion 310, to prevent detrimental loading in portions of the diamond table 210' when the diamond table 210' is secured to the supporting substrate 350. For example, in at least one embodiment, the cavity 230 and the protrusion 310 may be configured so the protrusion 310 will contact a surface of cavity 230 before the back side 270 contacts the supporting substrate 350. Such an embodiment may prevent the diamond table 210' from loading up on the periphery, which loading may result in the formation of cracks in the diamond table 210'. The gap created by such an embodiment between the back side 270 and the supporting substrate 350 may be filled with a graded carbide or other similar material. The cavity 230 and the protrusion 310 may also be formed with a non-uniform surface topography, as is known to those of ordinary skill in the art, to minimize detrimental stress concentrations and maximize beneficial stress concentrations when subsequently attached to the supporting substrate 350.

A grit material 260 may be disposed in at least a portion of the cavity 230, as well as between at least a portion of the supporting substrate 350 and the diamond table 210' according to one or more embodiments. The grit material 260 may help to prevent the diamond table 210' from fracturing due to the presence of cavity 230 as well as to aid in adhering the supporting substrate 350 to the diamond table 210'. As discussed above by way of example and not limitation, the grit material 260 may comprise a superhard or hard material such as diamond grit material, cubic boron nitride grit, silicon carbide, tungsten carbide or other similar superhard or hard materials which are known to those of ordinary skill in the art, as well as combinations thereof. In at least one embodiment, the grit material 260 may comprise diamond grit material comprising natural diamond, synthetic diamond, or a mixture, and may comprise diamond grit of different grain sizes. For example, the grit material mixture may comprise an average grain size between about 1 to 40 microns, although other grain size mixtures may be employed, depending on the mixtures and the pressing characteristics.

With continued reference to FIG. 3B, the grit material 260 may be disposed between at least the cavity 230 of the diamond table 210' and the protrusion 310 of the supporting substrate 350, as well as between the back side 270 of the diamond table 210' and the supporting substrate 350. The grit material 260 may be supplied with substantially no catalyst, or the grit material 260 may be supplied with sufficient catalyst from the supporting substrate 350, a catalyst may be mixed with the diamond grit, the grit particles may be coated or encapsulated by a catalyst, or any combination thereof, as are generally known to those of ordinary skill in the art. The catalyst may be the same or similar to the catalyst 220 employed in forming the diamond table 210 (FIG. 2A) or the catalyst may be different from the catalyst 220. As discussed above, in some embodiments the grit material 260 may be coated or encapsulated with a hard material such as tungsten.

At the conclusion of act 120 (FIG. 1), a polycrystalline diamond compact (PDC) cutting element 300 includes a diamond table 210" and the supporting substrate 350 having a portion extending into, and at least partially filling at least a portion of the cavity 230 of the diamond table 210". The PDC cutting element 300 may further include an adhesion layer 295. The adhesion layer 295 secures the diamond table 210" to the supporting substrate 350. The adhesion layer 295 comprises a compact of the superhard or hard material comprising the grit material 260, formed when the grit material 260 is subjected to the HTHP process in act 120, bonded to both the diamond table 210" and the supporting substrate 350. The adhesion layer 295 is positioned at least partially within at least a portion of the cavity 230.

When a catalyst is present with the grit material 260, the supporting substrate 350 or both, at least some catalyst may migrate into some or all of the diamond table 210". In such a case, the diamond table 210" may be subjected to another process to substantially and selectively remove the catalyst therefrom while precluding contact with the supporting substrate 350 and, by way of a non-limiting example, a portion of a side surface of the diamond table 210". For example, a leaching agent such as any of the abovementioned leaching agents may be employed. One particularly suitable leaching agent is hydrochloric acid (HCl) at a temperature of above 110° C. for a period of about 3 to about 60 hours, depending upon the depth of desired removal of the catalyst from a surface of diamond table 210" exposed to the leaching agent. Contact with the leaching agent may be precluded, as known in the art, by encasing the supporting substrate 350 and a portion of the diamond table 210" in a plastic resin, by coating the supporting substrate 350 and a portion of the diamond table 210" with a masking material, or by the use of an "O" ring seal resistant to the leaching agent, compressed against the side surface of the diamond table 210" using a plastic fixture. The resulting PDC cutting element 300 offers enhanced thermal stability and consequently wear resistance, during use due to the removal of catalyst from one or more regions of the diamond table 210". The presence of the catalyst material in another region or regions of the diamond table 210" may enhance durability and impact strength thereof.

With reference to FIGS. 2C and 3B, a barrier layer may be employed in some embodiments to prevent migration of a catalyst (if present) from the grit material 260, the supporting substrate 250, 350, or both, into the upper portions of the diamond table 210'. The barrier layer may also prevent unfavorable point loading between the layers during a conventional HTHP process. For example, a barrier layer 280A may be disposed between the diamond table 210' and the grit material 260 in some embodiments, as illustrated with broken lines, in the cross-sectioned views of FIGS. 2C and 3B. A barrier layer 280B, as illustrated with broken lines, may, alternatively or additionally, be disposed between the supporting substrate 250, 350 and the grit material 260 in embodiments in which a catalyst is admixed with the grit material 260 or encapsulates at least some of the grit material 260. The barrier layers 280A and 280B may comprise a layer of material configured to inhibit or prevent the progression of a catalyst into the diamond table 210'. Examples of such barrier layers are described in U.S. Pat. No. 4,766,040, the entire disclosure of which is incorporated herein by this reference. By way of example and not limitation, a suitable barrier layer may comprise a layer of metal, alloy or other materials having a relatively high melting point and having a thickness between about 1 and 300 μm. The barrier layer may be disposed as a metal foil, powder of metal or other material, or by using PVD or CVD methods.

Figure 4A:
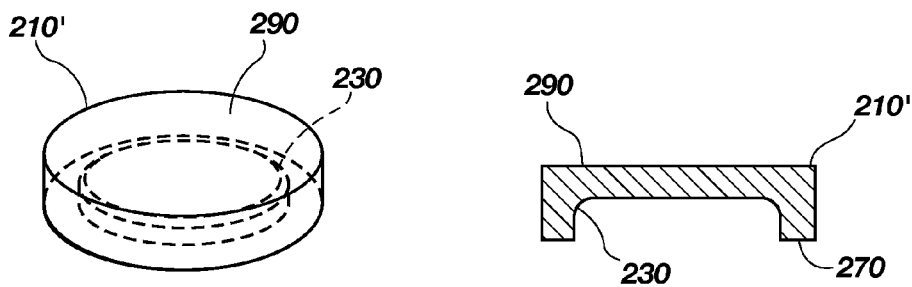
FIGS. 4A-4D depict the formation of a polycrystalline diamond compact cutting element according to a further embodiment corresponding to the process flow of FIG. 1.
Figure 4B:
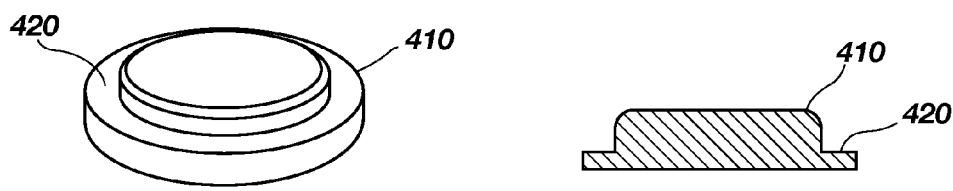

Turning to FIGS. 4A-4D, structures formed during the process flow illustrated in FIG. 1 according to another embodiment are illustrated. Referring to FIG. 4A, a diamond table 210' like the diamond table 210' of FIGS. 2B and 3A is formed. As discussed above, the diamond table 210' is formed from a diamond table 210 (FIG. 2A) formed in act 100 (FIG. 1). The diamond table 210 is formed comprising a mass of diamond particles (e.g., grit) in the presence of a catalyst 220 in a high pressure, high temperature process. The diamond table 210 is formed with a cavity 230 therein to comprise a thickness T in the area of the cavity 230, and an overall height H. As also discussed above, the diamond table 210 may be formed on a supporting substrate 240 or may be formed as a freestanding polycrystalline diamond compact without the supporting substrate 240. In act 110 (FIG. 1), the catalyst 220 is removed from the diamond table 210, and a supporting substrate 240 (if present) is removed from the diamond table 210. The resulting structure is diamond table 210' shown in FIG. 4A that is at least substantially free of the catalyst 220 and includes the cavity 230 formed therein.

Figure 4C:
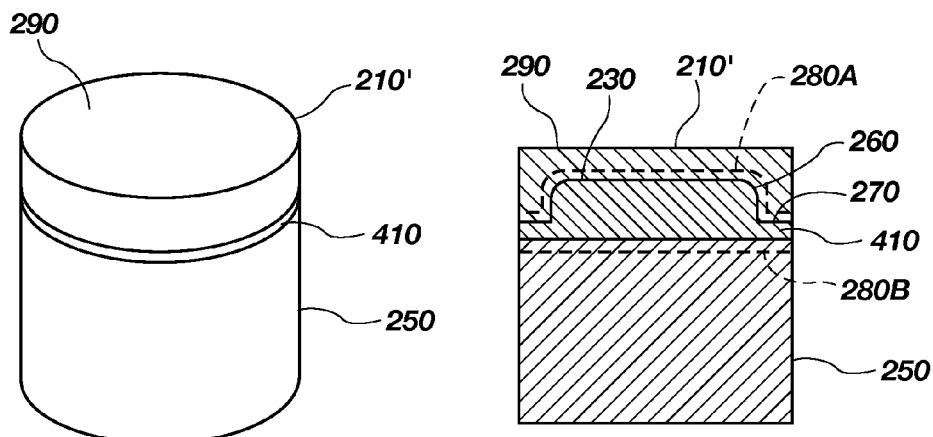
Figure 4D:
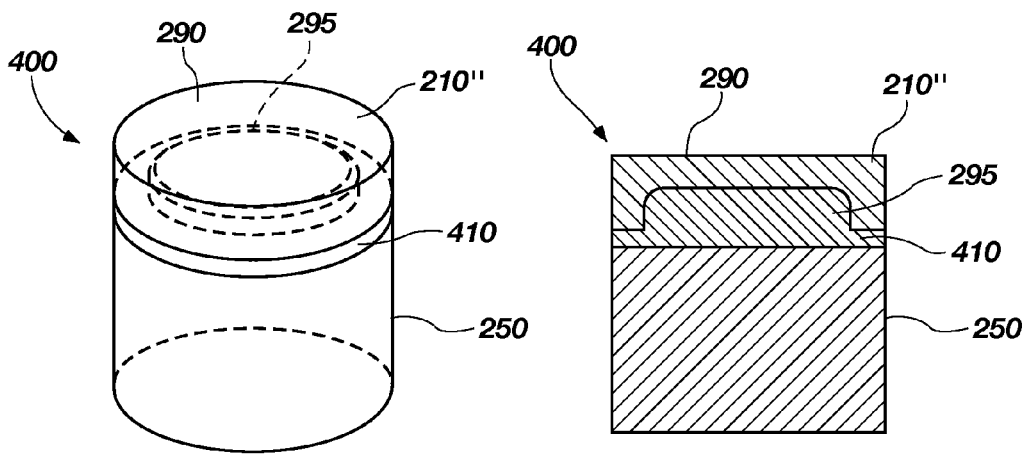

In act 120 (FIG. 1), the diamond table 210' is secured to another supporting substrate. In the present embodiment, an intermediate structure 410 (FIG. 4B) is disposed between at least a portion of the diamond table 210' and the supporting substrate 250 (FIG. 4C). The intermediate structure 410 is configured to at least substantially fill the cavity 230 of the diamond table 210'. In some embodiments, the intermediate structure 410 may be configured to only fill the cavity 230 and have a topography at least substantially coincident with a topography of the cavity 230 extending into the back side 270 of the diamond table 210'. In other embodiments, the intermediate structure 410 may be configured to extend beyond the cavity 230 of the diamond table 210', and may also include an annular flange 420 configured to extend to a periphery of the back side 270 and to be positioned between the back side 270 of the diamond table 210' and the supporting substrate 250.

The intermediate structure 410 may comprise a preformed diamond compact formed comprising a mass of diamond particles (e.g., grit) in the presence of a catalyst in a high pressure, high temperature process. In other embodiments, the intermediate structure 410 may comprise a preform of another material or combination of materials comprising a hardness that is close to the hardness of diamond. By way of example and not limitation, the intermediate structure 410 may comprise a material such as CVD diamond and other thin diamond coatings, tetrahedral amorphous carbon (ta-C—a mixture of carbon exhibiting mostly $sp^3$ bonded diamond), Beta-SiC, Beta-BN, or carbon nanotubes. The preform need not be a result of an HTHP process even if formed of diamond grit or other superhard or hard particles, but may comprise a particulate mass bonded together by a resin or other adhesive, which may be removed during subsequent processing.

Referring to FIG. 4C, the intermediate structure 410 is placed between the diamond table 210' and the supporting substrate 250 and secured thereto by any conventional process known to those of ordinary skill in the art. By way of example and not limitation, the intermediate structure 410, diamond table 210' and supporting substrate 250 may be secured together in another conventional high temperature, high pressure (HTHP) process. In some embodiments, the intermediate structure 410 may be secured to the supporting substrate 250 prior to attaching the diamond table 210'. In such embodiments, the intermediate structure 410 together with the supporting substrate 250 may be provided as a unified structure to which the diamond table 210' may be subsequently attached.

In some embodiments, the cavity 230 may be formed and configured, in correlation with the intermediate structure 410, to prevent detrimental loading in portions of the diamond table 210' when the diamond table 210' is secured to the intermediate structure 410. For example, in at least one embodiment, the cavity 230 and the intermediate structure 410 may be configured so the intermediate structure 410 will contact a surface of cavity 230 before the back side 270 contacts the supporting substrate 250 or the annular flange 420, depending on the configuration. Such an embodiment may prevent the diamond table 210' from loading up on the periphery during a conventional HTHP process, which loading may result in the formation of cracks in the diamond table 210'. The gap created by such an embodiment between the back side 270 and the supporting substrate 250 or the annular flange 420 may be filled with a graded carbide or other similar material. The cavity 230 and the intermediate structure 410 may also be formed with a non-uniform surface topography, as is known to those of ordinary skill in the art, to minimize detrimental stress concentrations and maximize beneficial stress concentrations when subsequently attached to the intermediate structure 410.

In at least some embodiments, a grit material 260 may be disposed between at least a portion of the intermediate structure 410 and the diamond table 210'. The grit material 260 may help to prevent point loading or, other effects that may cause the diamond table 210' to fracture. As discussed above by way of example and not limitation, the grit material 260 may comprise a superhard material such as diamond grit material, cubic boron nitride grit, silicon carbide, tungsten carbide or other similar superhard or hard materials that are known to those of ordinary skill in the art, as well as combinations thereof. In at least one embodiment, the grit material 260 may comprise diamond grit material comprising natural diamond, synthetic diamond, or a mixture, and may comprise diamond grit of different grain sizes. For example, the grit material mixture may comprise an average grain size between about 1 to 40 microns, although other grain size mixtures may be employed, depending on the mixtures and the pressing characteristics.

The grit material 260 may be supplied with substantially no catalyst, or the grit material 260 may be supplied with sufficient catalyst from the intermediate structure 410, a catalyst may be mixed with the diamond grit, the grit may be coated or encapsulated by a catalyst, or any combination thereof, as are generally known to those of ordinary skill in the art. The catalyst may be the same or similar to the catalyst 220 employed in forming the diamond table 210 (FIG. 2A) or the catalyst may be different from the catalyst 220. As discussed above, in some embodiments the grit material 260 may be coated or encapsulated with a hard material such as tungsten.

At the conclusion of act 120 (FIG. 1), a polycrystalline diamond compact (PDC) cutting element 400 includes a diamond table 210", an intermediate structure 410 and a supporting substrate 250. At least part of the intermediate structure 410 may comprise a part of an adhesion layer 295. The adhesion layer 295 secures the diamond table 210" to the supporting substrate 250.

When a catalyst is present with the grit material 260, the intermediate structure 410, the supporting substrate 250 or a combination thereof, at least some catalyst may migrate into some or all of the diamond table 210". In such a case, the diamond table 210" may be subjected to another process to substantially and selectively remove the catalyst therefrom while precluding contact with the supporting substrate 250 and, by way of a non-limiting example, a portion of a side surface of the diamond table 210" and the intermediate structure 410. For example, a leaching agent such as any of the abovementioned leaching agents may be employed. One particularly suitable leaching agent is hydrochloric acid (HCl) at a temperature of above 110° C. for a period of about 3 to about 60 hours, depending upon the depth of desired removal of the catalyst from a surface of diamond table 210" exposed to the leaching agent. Contact with the leaching agent may be precluded, as known in the art, by encasing the supporting substrate 250, the intermediate structure 410 and a portion of the diamond table 210" in a plastic resin, by coating the supporting substrate 250, the intermediate structure 410 and a portion of the diamond table 210" with a masking material, or by the use of an "O" ring seal resistant to the leaching agent, compressed against the side surface of the diamond table 210" or the intermediate structure 410 using a plastic fixture. The resulting PDC cutting element 400 offers enhanced thermal stability and consequently wear resistance, during use due to the removal of catalyst from one or more regions of the diamond table 210". The presence of the catalyst material in another region or regions of the diamond table 210" may enhance durability and impact strength thereof.

With reference to FIG. 4C, a barrier layer may be employed in some embodiments to prevent migration of a catalyst (if present) from any grit material 260, the intermediate structure 410, the supporting substrate 250, 350, or a combination thereof, into the upper portions of the diamond table 210'. The barrier layer may also prevent unfavorable point loading between the layers during a conventional HTHP process. For example, a barrier layer 280A may be disposed between the diamond table 210' and the intermediate structure 410, including any grit material 260 in some embodiments, as illustrated with broken lines, in the cross-sectioned view of FIG. 4C. A barrier layer 280B, as illustrated in broken lines, may, alternatively or additionally, be disposed between the supporting substrate 250 and the intermediate structure 410. The barrier layers 280A and 280B may comprise a layer of material configured to inhibit or prevent the progression of a catalyst into the diamond table 210'. By way of example and not limitation, a suitable barrier layer may comprise a layer of metal, alloy or other materials having a relatively high melting point and having a thickness between about 1 and 300 μm. The barrier layer may be disposed as a metal foil, powder of metal or other material, or by using PVD or CVD methods.

Depending on the intended application for a polycrystalline diamond compact 200, 300, 400, a binder may be disposed adjacent to a cutting surface 290 (see FIGS. 2B-2D, 3A-3C and 4A-4D) of the diamond table 210' during act 120. The binder material may comprise any conventional binder material or soft alloy disc to back-fill the pores created when the catalyst 220 was removed, as is generally known to those of ordinary skill in the art. By way of example and not limitation, silicon and/or silicon carbide binder may be employed to at least substantially fill the pores resulting from the removal of the catalyst 220, as is described in U.S. Pat. Nos. 4,151,686 and 4,793,828, the disclosure of each of which is incorporated in its entirety herein by this reference. The use of such a binder may also inhibit the migration of a catalyst from the intermediate structure 410, the grit material 260 and/or the supporting substrate 250, 350 into the upper portions of the diamond table 210'.

Figure 5:
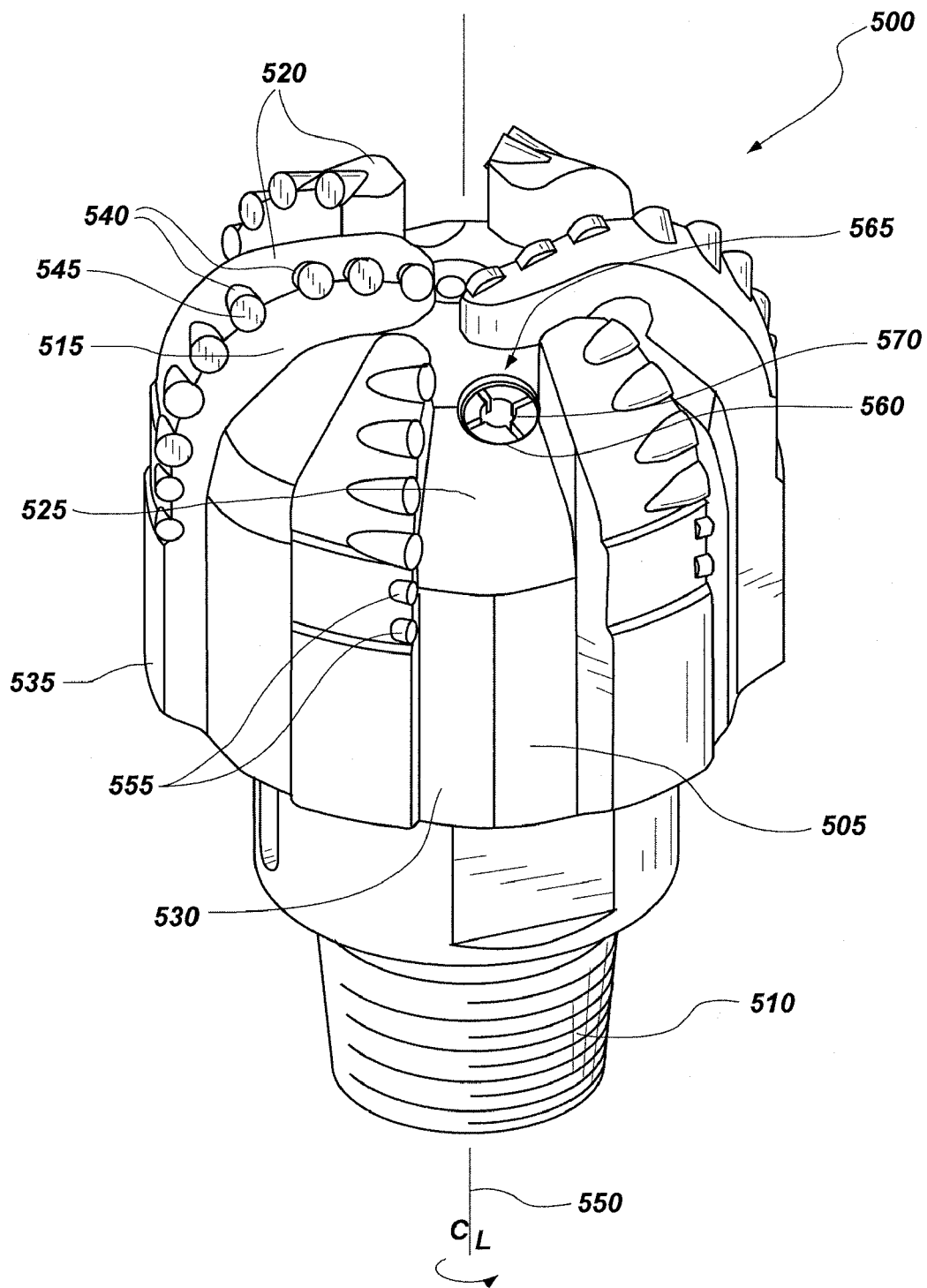
FIG. 5 depicts one example of a rotary drag bit having cutting elements according to an embodiment of the present invention mounted thereto.

Referring to FIG. 5 of the drawings, an earth-boring tool 500 in the form of a rotary drag bit is shown. As used herein, the term "earth-boring tool" includes and encompasses drag bits, roller cone bits, hybrid bits, reamers, mills and other subterranean tools for drilling and enlarging well bores.

The earth-boring tool 500, which may be configured as a rotary drag bit, includes a bit body 505 having a shank 510 at one longitudinal end thereof and a face 515 at an opposing end thereof. The shank 510 includes threads configured to API standards and adapted for connection to a component of a drill string, not shown. The face 515 may include a plurality of generally radially extending blades 520 thereon forming fluid courses 525 therebetween extending to junk slots 530 between circumferentially adjacent blades 520. The bit body 505 may comprise a tungsten carbide matrix or a steel body, both as well known in the art.

Blades 520 may include a gage region 535 configured to define the outermost radius of the drill bit 500 and, thus, the radius of the wall surface of a bore hole drilled thereby. Gage regions 535 comprise longitudinally upward (as the drill bit 500 is oriented during use) extensions of blades 520 and may have wear-resistant inserts or coatings, such as cutting elements, or hardfacing material, on radially outer surfaces thereof as known in the art to inhibit excessive wear thereto.

The face 515, and in some embodiments the blades 520, include a plurality of cutting elements 540, at least some of which exhibit structure according to an embodiment of a cutting element 200, 300 or 400 of the present disclosure comprising a polycrystalline diamond compact (PDC) table 545 formed on a supporting carbide substrate. The cutting elements 540 are positioned to cut a subterranean formation being drilled while the earth-boring tool 500 is rotated under weight on bit (WOB) in a bore hole about centerline 550.

As stated above, the gage regions 535 may include gage trimmers 555, at least some of which may exhibit structure according to an embodiment of a cutting element of the present invention, each gage trimmer 555 including one of the aforementioned PDC tables 545, PDC tables 545 being configured with an edge (not shown) to trim and hold the gage diameter of the bore hole, and pads (not shown) on the gage which may contact the walls of the bore hole and stabilize the bit in the hole.

During drilling, drilling fluid is discharged through nozzle assemblies 560 located in nozzle ports 565 in fluid communication with the face 515 of bit body 505 for cooling the PDC tables 545 of cutting elements 540 and removing formation cuttings from the face 515 of the earth-boring tool 500 into fluid courses 525 and junk slots 530. The apertures 570 of nozzle assemblies 560 may be sized for different fluid flow rates depending upon the desired flushing required at each group of cutting elements 540 to which a particular nozzle assembly 560 directs drilling fluid.

Although the foregoing description contains many specifics and examples, these are not limiting to the scope of the present invention, but merely as providing illustrations of some embodiments. Similarly, other embodiments of the invention may be devised which do not depart from the scope of the present invention. The scope of this invention is, therefore, indicated and limited only by the appended claims and their legal equivalents, rather than by the foregoing description. All additions, deletions and modifications to the invention as disclosed herein and which fall within the meaning of the claims are embraced within their scope.

What is claimed is:

1. A method of forming a polycrystalline diamond element, comprising:
    forming a polycrystalline diamond table comprising a catalyst and including a cavity in a surface thereof;
    at least substantially removing the catalyst from the polycrystalline diamond table to form a polycrystalline diamond table at least substantially free of the catalyst;
    disposing a grit material in at least a portion of the cavity of the polycrystalline table at least substantially free of the catalyst and disposing a supporting substrate on a side of the grit material opposing a side on which the polycrystalline table at least substantially free of the catalyst material is disposed; and
    sintering the grit material to form an adhesion layer bonded to the polycrystalline diamond table at least substantially free of the catalyst and secured to the supporting substrate.

2. The method of claim 1, wherein forming the polycrystalline diamond table comprises forming a diamond table on a supporting substrate configured to form the cavity.

3. The method of claim 2, further comprising removing the supporting substrate on which the diamond table is formed.

4. The method of claim 1, wherein at least substantially removing the catalyst from the polycrystalline diamond table comprises subjecting the polycrystalline diamond table to a leaching process for no more than two weeks.

5. The method of claim 1, wherein forming the polycrystalline diamond table comprises forming a freestanding diamond table.

6. The method of claim 1, further comprising back-filling pores of the polycrystalline diamond table adjacent to a cutting surface of the polycrystalline diamond table with a binder material selected from the group consisting of silicon and silicon carbide.

7. The method of claim 1, wherein disposing the grit material in the at least a portion of the cavity of the polycrystalline diamond table comprises at least substantially filling the cavity of the polycrystalline diamond table.

8. The method of claim 7, further comprising disposing the grit material to at least partially cover the surface of the polycrystalline diamond table beyond the cavity therein.

9. The method of claim 1, wherein disposing the grit material in the at least a portion of the cavity of the polycrystalline diamond table comprises disposing the grit material in the cavity between the polycrystalline diamond table and a protrusion on a surface of the supporting substrate extending into the cavity.

10. The method of claim 1, wherein disposing the grit material in the at least a portion of the cavity of the polycrystalline diamond table comprises disposing a grit material comprising at least one of diamond grit and cubic boron nitride grit.

11. The method of claim 10, wherein disposing the grit material in the at least a portion of the cavity of the polycrystalline diamond table comprises disposing a diamond grit material comprising a mixture of grain sizes, and further comprising selecting the average grain size of the mixture to be in the range consisting of 1 micron to 40 microns.

12. The method of claim 1, further comprising disposing a barrier layer between the grit material and at least one of the polycrystalline diamond table and the supporting substrate.

13. The method of claim 1, further comprising removing a catalyst included with at least one of the grit material and the supporting substrate from at least a portion of the polycrystalline diamond table by leaching after the polycrystalline diamond table is bonded to the supporting adhesion layer.

14. The method of claim 1, wherein sintering comprises subjecting the polycrystalline diamond table at least substantially free of the catalyst material, the grit material, and the supporting substrate to a high temperature, high pressure process.

15. The method of claim 1, further comprising securing an intermediate structure at least within a portion of the cavity and between at least a portion of the polycrystalline diamond table and the supporting substrate.

16. The method of claim 15, wherein securing the intermediate structure at least within a portion of the cavity comprises securing a diamond table intermediate structure.

17. The method of claim 15, wherein the intermediate structure is secured to the supporting substrate prior to securing the intermediate structure at least within a portion of the cavity.

18. A method of forming a PDC cutting element, comprising:
    forming a diamond table with a cavity in a back side surface thereof;
    at least substantially removing catalyst from the diamond table to form a diamond table at least substantially free of the catalyst;
    disposing a grit material in the cavity and between the back side surface of the diamond table and a supporting substrate;
    disposing a binder material selected from the group consisting of silicon and silicon carbide adjacent a cutting surface of the diamond table;
    sintering the grit material to form an adhesion layer bonded to the diamond table and secured to the supporting substrate; and
    back-filling pores of the diamond table adjacent the cutting surface with the binder material.

19. The method of claim 18, wherein sintering the grit material to form the adhesion layer comprises sintering the grit material to form a superhard material comprising at least one of polycrystalline, diamond and polycrystalline cubic boron nitride.

20. The method of claim 18, further comprising disposing at least one barrier layer between the grit material and at least one of the diamond table and the supporting substrate and infiltrating the at least one of the diamond table and the supporting substrate with material of the barrier layer while sintering.

21. The method of claim 18, wherein sintering the grit material to form the adhesion layer comprises sintering the grit material to form an adhesion layer comprising a catalyst therein.

22. The claim 18, wherein at least substantially removing catalyst from the diamond table comprises subjecting the diamond table to a leaching process for about 1 week.

23. A method of forming a polycrystalline diamond cutting element, comprising:
    sintering a first time to form a polycrystalline diamond table with a cavity in a back side surface thereof;
    at least substantially removing catalyst from the polycrystalline diamond table to form a polycrystalline diamond table at least substantially free of the catalyst;
    at least partially inserting a protrusion of a supporting substrate into the cavity of the diamond table;
    disposing a grit material in at least one of the cavity and a gap defined between the back side surface of the diamond table and the supporting substrate; and
    sintering a second time to form an adhesion layer from the grit material interposed between the diamond table and the supporting substrate, wherein sintering the second time to form the adhesion layer comprises bonding the adhesion layer to the diamond table and securing the adhesion layer to the supporting substrate.

24. The method of claim 23, wherein sintering the first time to form the polycrystalline diamond table with the cavity in the back side surface thereof comprises forming the polycrystalline table to have a thickness of between 1 mm and 2.5 mm and a height of between 1 mm and 4 mm.

25. The method of claim 23, further comprising selecting the supporting substrate to comprise cemented tungsten carbide.

26. The method of claim 23, wherein disposing the grit material in the at least one of the cavity and the gap defined between the back side surface of the diamond table and the supporting substrate comprises disposing the grit material in both the cavity and the gap defined between the back side surface of the diamond table and the supporting substrate.

27. The method of claim 23, further comprising disposing a barrier layer between the supporting substrate and the grit material.

28. The method of claim 23, wherein sintering the second time to form the adhesion layer comprises sintering the second time to form an adhesion layer comprising a superhard material comprising at least one of polycrystalline diamond and polycrystalline cubic boron nitride.

29. The method of claim 23, wherein sintering the grit material to form the adhesion layer comprises sintering the grit material to form an adhesion layer comprising a catalyst therein.

30. A cutting element for use with an earth-boring tool, comprising:
    a diamond table comprising at least a face portion that is at least substantially free of a catalyst and a cavity on a back side of the diamond table opposing the face portion;
    an adhesion layer directly bonded to the diamond table and disposed within at least a portion of the cavity and over at least a portion of the back side of the diamond table;
    a supporting substrate secured to the adhesion layer on a side of the adhesion layer opposing a side to which the diamond table is bonded, the supporting substrate comprising a protrusion extending at least partially into the cavity.

31. The cutting element of claim 30, wherein the face portion of the diamond table comprises at least one of silicon and silicon carbide dispersed throughout the diamond table adjacent to the face portion.

32. The cutting element of claim 30, wherein the supporting substrate comprises cemented tungsten carbide.

33. The cutting element of claim 30, wherein the protrusion of the supporting substrate contacts at least a portion of the cavity in the back side of the diamond table.

34. The cutting element of claim 30, wherein the adhesion layer comprises a superhard material comprising at least one of polycrystalline diamond and polycrystalline cubic boron nitride.

35. The cutting element of claim 30, wherein the adhesion layer comprises a catalyst therein.

36. The cutting element of claim 30, wherein the adhesion layer comprises an intermediate structure positioned between a portion of the diamond table and the supporting substrate.

37. An earth-boring tool, comprising:
  a body; and
  at least one cutting element carried by the body and comprising:
    a diamond table comprising at least a face portion that is substantially free of a catalyst and a cavity in a surface opposing the face portion, the face portion comprising at least one of silicon and silicon carbide dispersed throughout the diamond table adjacent to the face portion;
    an adhesion layer directly bonded to the diamond table and disposed within the cavity; and
    a supporting substrate secured to the adhesion layer on a side opposing a side to which the diamond table is bonded.

38. The earth-boring tool of claim 37, wherein the supporting substrate of the at least one cutting element extends into at least a portion of the cavity.

39. The earth-boring tool of claim 37, wherein the adhesion layer comprises a superhard material comprising at least one of polycrystalline diamond and polycrystalline cubic boron nitride.

40. The earth-boring tool of claim 37, wherein the adhesion layer comprises a catalyst therein.

41. The cutting element of claim 37, wherein the adhesion layer comprises an intermediate structure positioned between a portion of the diamond table and the supporting substrate.

* * * * *

UNITED STATES PATENT AND TRADEMARK OFFICE
CERTIFICATE OF CORRECTION

PATENT NO. : 8,267,204 B2
APPLICATION NO. : 12/539349
DATED : September 18, 2012
INVENTOR(S) : Nicholas J. Lyons Page 1 of 1

It is certified that error appears in the above-identified patent and that said Letters Patent is hereby corrected as shown below:

In the specification:
COLUMN 3, LINE 53, change "terms the" to --terms of the--

Signed and Sealed this
Fifteenth Day of September, 2015

Michelle K. Lee
*Director of the United States Patent and Trademark Office*